July 13, 1954     S. TAKACH     2,683,407
SPEAKER-HEATER APPARATUS FOR DRIVE-IN THEATERS
Filed Jan. 12, 1952     3 Sheets-Sheet 1
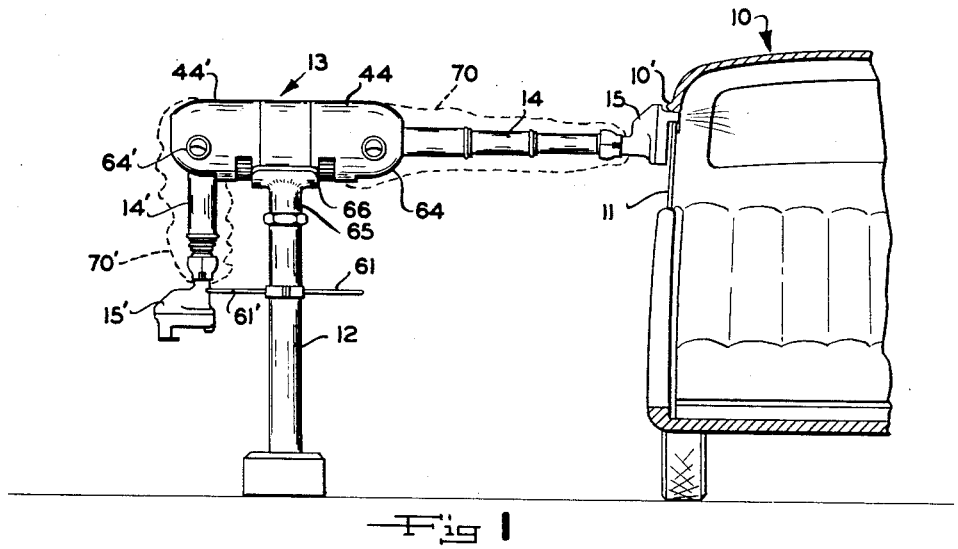
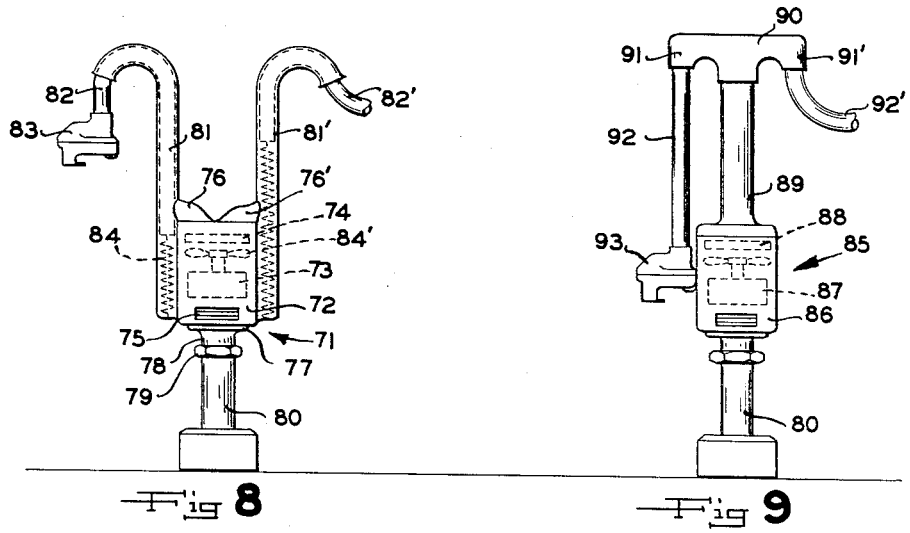
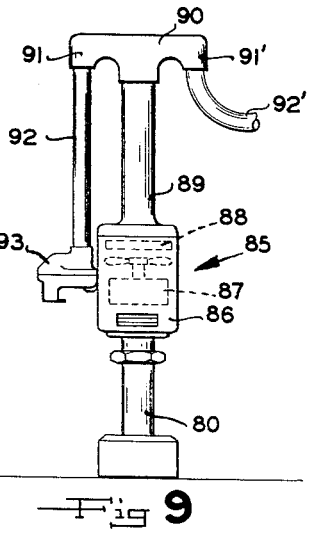
INVENTOR
SIGMUND TAKACH
BY *Francis J. Klempay*
ATTORNEY

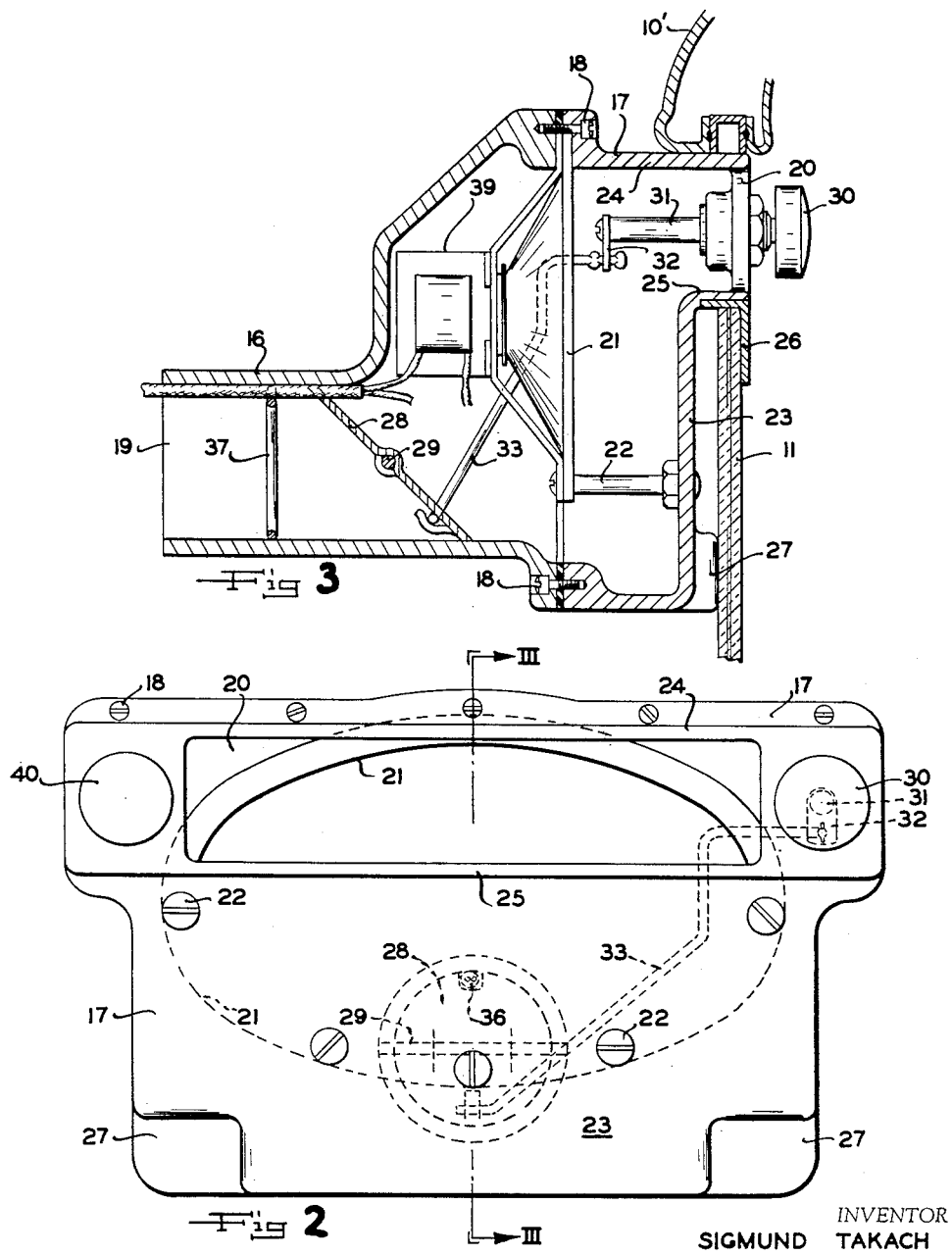

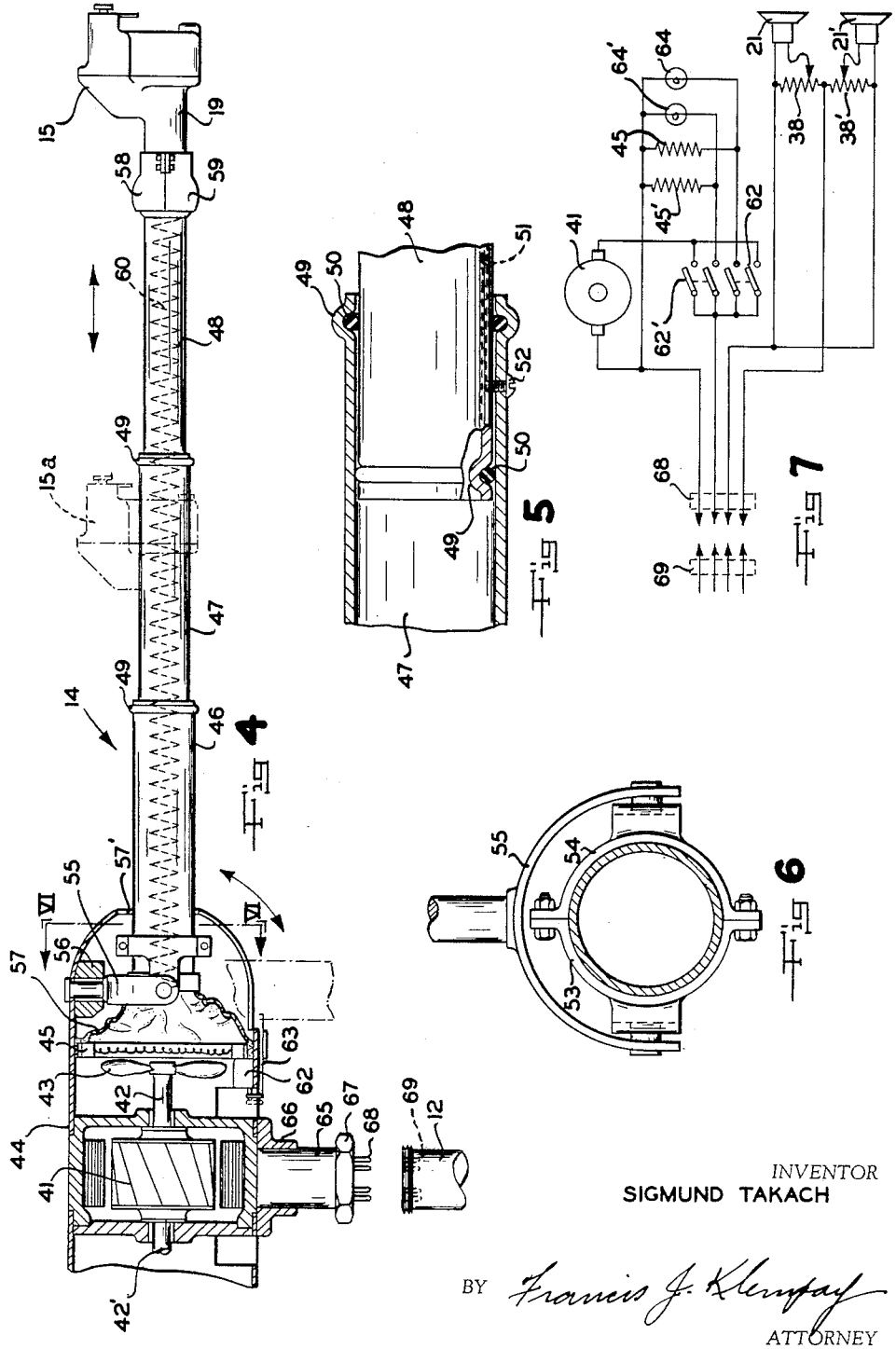

Patented July 13, 1954

2,683,407

UNITED STATES PATENT OFFICE 2,683,407

SPEAKER-HEATER APPARATUS FOR DRIVE-IN THEATERS

Sigmund Takach, Youngstown, Ohio

Application January 12, 1952, Serial No. 266,147

4 Claims. (Cl. 98—2)

This invention relates to apparatus for use in outdoor drive-in theater installations and the like, and more particularly to novel apparatus for simultaneously supplying audio energy and conditioned air to a parked automobile.

An object of this invention is the provision of improved apparatus of the character described which is adapted when connected to a source of electric power and to a source of audio signal to selectively supply a parked automobile with audio energy and/or conditioned air from a common outlet.

Another object of the present invention is the provision of "speaker-heater" apparatus for drive-in theaters including a common outlet box for both conditioned air and sound wherein the outlet box may be positioned substantially wholly externally of a parked automobile while supplying the same with air and sound. In prior apparatus of this general nature, wherein either individual speaker and heater units or combination assemblies have been utilized, it has been common practice to position the same substantially wholly within a parked automobile whereby the window through which the necessary duct means and/or conductor means are passed may remain nearly closed to minimize losses of conditioned air. As will appear, the arrangement of the present invention effectively provides for maintaining the window substantially closed while at the same time permits the bulky and unwieldy outlet box to be located outside the automobile so as not to become a nuisance to patrons seated therein.

A further object of this invention is the provision of apparatus as above described having a common outlet for air and sound which is adapted to be positioned within a small opening of an automobile window and which includes practical control means adapted to be positioned within the automobile for selectively regulating the flow of conditioned air and the volume of sound discharged into the automobile.

Another object of this invention resides in the provision of speaker-heater apparatus including a source of conditioned air located externally of an automobile and a common outlet box adapted to be located immediately adjacent the automobile wherein universally mounted telescoping duct means is utilized for transmitting conditioned air from the source to the outlet box. According to the teachings set forth herein a speaker-heater outlet box may be rigidly affixed to an external mounting stand whereby theft of the box and speaker unit therein is virtually precluded while at the same time the outlet box may be readily and effortlessly moved to various positions for mounting upon an automobile parked in position to view the theater screen.

Yet another object of the present invention is the provision of speaker-heater apparatus for drive-in theaters and the like including a novel mounting arrangement therefor whereby upon patrons' leaving the theater the air-sound outlet box may be disconnected from the automobile and merely dropped, freeing the patrons and/or paid attendants from the duty of placing the box upon a hook or other suitable receptacle.

In accordance with the above it is another object of the invention to provide speaker-heater apparatus for parked automobiles utilizing externally positioned electrically powered air conditioning apparatus wherein means are provided for automatically deenergizing the conditioning apparatus upon the automobile leaving the parking stall.

Yet another object of the invention is the provison of apparatus of the character described including novel quick-disconnect means for mounting the apparatus adjacent an automobile parking stall whereby the entire apparatus may be quickly and easily removed and replaced to facilitate necessary maintenance and repair and to permit ready removal of the apparatus at the end of the trade season.

The above and various other objects and advantages of the invention will become apparent upon full consideration of the following detailed specification and accompanying drawing wherein are disclosed certain preferred embodiments of my invention.

In the drawing:

Figure 1 is a plan view of a speaker-heater installation constructed in accordance with the teachings of my invention for use in servicing a pair of parked automobiles;

Figure 2 is a front plan view of a combined sound-air outlet box as constructed in accordance with the teachings of my invention;

Figure 3 is a section view taken along line III—III of Figure 2;

Figure 4 is an enlarged fragmentary view, partly in section, of the apparatus of Figure 1 showing details of the construction thereof;

Figure 5 is an enlarged fragmentary section view of the apparatus of Figure 1 showing details of construction of the conditioned-air duct means utilized therewith;

Figure 6 is a fragmentary section view taken generally along line VI—VI of Figure 4 showing a universal mounting arrangement for the duct means of my apparatus;

Figure 7 is a diagrammatic representation of the electrical circuiting for my apparatus;

Figure 8 is a plan view of another embodiment of my invention; and

Figure 9 is a plan view of yet another embodiment of my invention.

Referring to Figure 1 the reference numeral 10 designates an automobile parked at a suitable stall or ramp at a drive-in theater, for example. Positioned remotely of the automobile 10 and mounted at a height substantially equal to that of the window 11 thereof by means of a pedestal 12 is an air conditioning unit 13 of a type constructed in accordance with the teachings of my present invention and the disclosure of my co-pending application Ser. No. 205,319, filed January 10, 1951, entitled "Combination Speaker and Heater for Outdoor Theaters." Mounted at the right and left sides respectively of the conditioning unit 13 are duct members 14 and 14', each mounting at its outer end an outlet box 15 or 15'. The outlet boxes 15 and 15' are adapted to be positioned adjacent a window 11 of an automobile and to discharge conditioned air and sound thereinto as will presently appear.

Outlet box 15 (or 15'), illustrated in detail in Figures 2 and 3, comprises a pair of body members 16 and 17 which are secured together by means of a plurality of screws 18 so as to form an enclosed housing having openings 19 and 20 therein for the inlet and outlet respectively of conditioned air. Securely mounted within the enclosed body members 16 and 17 is a radio-type sound translating device 21 which preferably has an ovate principal outline as shown in Figure 2. In the illustrated form of the invention the translating device 21 is clamped at its upper edge portion between body members 16 and 17, and is secured along its lower edge portion to the body member 17 by means of a plurality of bolts 22.

Body member 17 has a substantially vertically disposed flat front wall 23 which terminates near the upper portion of the member 17 at an outwardly extending duct-like portion comprising closely spaced laterally extending upper and lower walls 24 and 25. The lower wall 25 extends outwardly of vertical wall 23 a distance somewhat greater than the thickness of a standard automobile window 11. Secured to the lower side of wall 25 and depending downwardly from the forwardly extending edge thereof are retaining clips 26 by means of which the box 15 may be supported upon the upper edge of a window 11. A plurality of contact pads 27 are positioned at the lower portion of front wall 23 and are adapted to contact the outer face of the window 11 whereby the wall 23 will be normally oriented in parallel relation to a window 11 of standard thickness, but whereby the box 15 may be readily supported upon windows of substantially greater or less thickness. The contact pads 27 may be integral with the body member 17 in the manner shown, or may be of resilient material and attached thereto as will be understood.

Outlet opening 20, formed in part by upper and lower walls 24 and 25, is of flat elongated cross section as shown in Figure 2 whereby the same may be positioned between the upper edge of the window 11 and the top frame rail 16' therefor while leaving but a small opening therebetween. Thus when the apparatus is in operating position as shown in Figure 1, and is discharging conditioned air into an automobile 11 there is but a small opening provided for the escape of air from the automobile, which opening is generally just sufficient to provide normal circulation of air as required by the constant input of conditioned air through the outlet opening 20.

According to the teachings of the invention conditioned air from the conditioning unit 13 enters the box 15 through inlet opening 19 and flows through the box before being discharged through outlet opening 20. To provide an adequate flow path for the air the sound translating device 21 has been positioned in spaced relation to the vertical front wall 23 whereby air may readily flow upwardly along the wall 23 and out through the opening 20. The inlet opening 19 is preferably located in the lower portion of the body member 16 so that air may easily flow between the lower edge of the translating device 21 and the lower wall portion of body member 17.

Since in the illustrated embodiment of the invention both air and sound are discharged from the common outlet opening 20 it is preferable that means for controlling the flow of air through the opening 20 be positioned on the side of the translating device 21 away from the opening 20 so that the air flow may be regulated without effecting the volume and/or quality of sound emitted from the opening 20. In accordance with the teachings of the present invention I have accomplished this by providing a conventional butterfly-type valve 28 substantially at the innermost end of the cylindrical inlet passage 19. The valve 28 is pivotally mounted about a generally horizontal axis by means of a pin 29 supported in the sides of the passage 19 and is of elliptic shape whereby the passage 19 may be fully closed with the valve 28 inclined at an angle of, for example, forty-five degrees with respect to the principal axis of the passage 19. For operating the valve 28 between the fully closed and fully open positions I have provided a rotatable control knob 30 which is mounted upon the body member 17 adjacent the outlet opening 20 whereby to extend into the automobile 10 for ready access by a patron seated therein. The knob 30 operates a shaft 31 which extends substantially into the box 15 and which mounts at its extending free end a crank 32. A wire 33 or other suitable connecting member is provided for connecting the crank 32 with the lower portion of valve 28 whereby rotary movement of the crank 30 may be translated into pivotal movement of the valve 28 between the fully closed and fully open positions thereof.

Operating potential for the translating device 21 is supplied by means of conductors 34 and 35 which preferably are passed through the duct member 14. To avoid interference between the conductors 34 and 35 and valve 28 I have provided a recess 36 in the upper edge portion of the valve 28 which is sufficiently large to receive conductors 34 and 35 when valve 28 is in the fully closed position. To maintain the conductors 34 and 35 in alignment with the recess 36 at all times I have provided a spring retaining clip 37 which is received in the passage 19 and which operates to urge conductors 34 and 35 against the upper wall thereof.

Volume control for the translating device 21 is provided by means of a suitable potentiometer 38 (see Fig. 7) which is associated with conductors 34 and 35 and with the operating coil 39 of said translating device 21. The setting of potentiometer 38 may be varied by manipulation of a control knob 40 positioned on the box 15 adjacent outlet opening 20 whereby volume adjustment may be readily made by patrons seated within the automobile 10.

The air conditioning unit 13 utilized in the illustrated embodiment of the invention comprises an electric motor 41 having shafts 42 and 42' extending from each side thereof each mounting a fan blade as at 43. In its preferred arrangement the conditioning unit 13 is of dual construction for serving a pair of parked automobiles from the single electric motor 41. Both halves of the unit 13 are substantially the same and accordingly but one will be described in detail. Corresponding parts, where illustrated, will be indicated by means of corresponding basic and primed reference numerals.

As shown in Figure 4 a generally cylindrical housing 44 is secured to and extends outwardly of the housing of the common motor 41. Positioned within the housing 44 substantially immediately adjacent the fan 43 is an electric heating element 45 which is adapted when energized to heat air passed therethrough by the fan 43. The heating element 45 may be thermostatically controlled if desired.

Duct means 14 is utilized for transmitting the heated air to the outlet box 15, and in the embodiment illustrated in Figures 1-6 the same comprises a plurality of tubular sections 46, 47 and 48 of progressively decreasing diameter which are adapted to telescope whereby the box 15 may be shifted longitudinally as indicated at 15 and 15a of Figure 4 so that a person need not accurately space his automobile from the unit 13 when parking in viewing position. The sections 46—48 may be constructed of aluminum or other suitable tubing and as shown in Figure 5 are preferably provided with annular recesses 49 near their end portions for the reception of O-ring type sealing members 50. In the illustrated arrangement cooperating grooves and stop screws 51 and 52 respectively are provided in adjacent tubular sections to prevent relative rotation of the sections and also to limit the relative longitudinal movement of the sections to prevent separation thereof. The innermost section 46 is pivotally mounted for universal movement with respect to the housing 44 by means of trunnions 53 and 54 and supporting yoke therefor 55. As indicated in Figures 4 and 6 trunnions 53 and 54 permit pivotal movement of the duct 14 about a horizontal axis, while yoke 55 is pivotally suspended from the housing 44 by means of bearing block 56 to permit pivotal movement about a vertical axis. Housing 44 is provided with a keyhole-shaped opening 57' whereby when the duct 14 is in a generally horizontally extended position as indicated in Figure 4 universal movement of the duct 14 is permitted whereas with the duct hanging downward in an idle position movement is confined substantially to a single vertical plane.

To confine the air directed outwardly from fan 43 to the passage provided therefor by duct 14 I have provided an annular flexible sealing member 57 which is secured along its outer edge to the side wall of housing 44 and along its inner edge to the side wall of tubular section 46 near its inner terminus.

Tubular section 48, located at the outer end of duct 14, is provided with a bulbous end portion of spherical shape which is adapted to have cooperative engagement with similarly shaped clamping members 58 and 59 which may be secured in the manner shown to the inlet passage portion of box 15 whereby the latter is securely attached to the duct 14 in such manner as to have limited universal movement with respect thereto. It will be readily apparent that the combined universal movements of the duct 14 with respect to the housing 44 and the outlet box 15 with respect to the housing 44 and the outlet box 15 with respect to the duct 14 provide that despite the "rigid" manner in which the box 15 is secured it may be easily adjusted to the proper position to an automobile 10 parked nearby substantially regardless of the physical dimensions of the car and, within limits, of the position of the car with respect to the conditioning unit 13.

In accordance with the objects of the invention I have provided resilient means in the form of an extensible spring 60 which is secured to each of the end members 46 and 48 of duct 14 whereby when the apparatus is not in use the outlet box 15 will automatically be drawn into a retracted position, as for example is the box 15' in Figure 1. Thus it will be apparent that patrons when leaving may merely detach the outlet boxes from the windows of their automobiles and let them drop. Spring 60 will automatically retract the telescoping duct 14 if the patrons neglect to do so. Outwardly extending semi-resilient brackets 60 and 60' are preferably secured to the pedestal 12 to break the fall of the box 15 as it swings downwardly upon being released by a patron.

It should be particularly noted that the outlet boxes 15 and 15', when not in use, will at all times be disposed so that the outlet openings 20 are directed downwardly. Thus the sound translating device or speaker 21 is fully protected from rain or snow or the like, and a materially increased operating life of the speaker may be realized; it being understood that in prior and now existing outdoor speaker installations a major cause of speaker failure has been wetting or moistening of the speaker cone.

It has been found desirable to provide means for automatically deenergizing the heating element 45 when the outlet box 15 is not in use, and for this purpose I have provided a limit switch 62 which is mounted within the casing 44 and which has an operator 63 extending into the path of movement of the duct 14 whereby upon the same being dropped into its lowermost position switch 62 will be opened. As may be observed in Figure 7, motor 41 is also controlled by means of limit switches, but since the motor 41 provides a common source of air for heating elements 45 and 45' of a dual conditioning unit 13 I have provided circuiting including switch 62 and corresponding switch 62' whereby both of said switches must be opened before motor 41 is deenergized. It will be noted additionally that with the duct 14 in the downward position the annular flexible sealing member 57 will substantially close off the end opening in the duct whereby the power burden upon the motor 41 is measurably decreased.

It is generally preferred, particularly in the outdoor theater industry, to provide a pilot light with each automobile servicing unit whereby it may be readily ascertained which units are in operation and in addition so that a certain amount of light is provided about the parking area whereby patrons may more easily find their way to refreshment stands and the like. In the embodiment of the invention illustrated in Figures 1-6 I have mounted pilot lights 64 and 64' upon housings 44 and 44' respectively and it is contemplated that the lights 64 and 64' will be controlled, as are heating elements 45 and 45', by means of limit switches 62 and 62'.

For mounting the conditioning unit 13 upon the pedestal 12 in such manner as to be quickly detachable therefrom for servicing, for example, I have secured a short section of structural conduit 65 to the unit 13 by means of an arcuate mounting plate 66. It is contemplated that at least the upper portion of the pedestal 12 will be of similar structural conduit, and thus for joining the conduit 65 to the pedestal 12 I may utilize a conventional pipe coupling including nut 67 as shown particularly in Figure 4. Suitable cooperating jack plug parts 68 and 69 may be secured in each of the conduit sections 12 and 65 whereby the necessary electrical connections may be made between the permanently mounted pedestal 12 and the detachable conditioning unit 13 as will be understood. Thus, it may be readily observed that the unit 13 may be mounted or removed by merely manipulating nut 67 and connecting or disconnecting the jack plug parts as the case may be.

For theater installations in climate zones where particularly cold and/or rainy weather may be expected within the normal profitable trade season it may be desirable to provide insulating means for the telescoping ducts 14 and 14' whereby a greater heating efficiency may be obtained and whereby freezing-up and sticking of the telescoping parts may be prevented. For this purpose I may optionally provide sleeves 70 and 70' of water-repellent or waterproof canvas or other suitable flexible material which may be secured to the housings 44 and 44' and outlet boxes 15 and 15' in the manner shown in Figure 1 so as to completely protect the ducts 14 and 14' from rain, etc., and to provide an insulating dead-air space about the exposed surfaces of the ducts.

In Figure 8 I have shown a second embodiment of my invention utilizing retractable flexible duct means in place of the rigid but telescoping means described above. In the arrangement shown I have provided a conditioning unit 71 comprising a body housing a blower motor 73 and heating element 74 and having a fresh air inlet opening 75 therein at its lower end and a pair of conditioned air outlets 76 and 76' therein at its upper end. Mounting plate 77, conduit section 78, coupling nut 79 and fixed pedestal 80 comprise means for detachably mounting the conditioning unit 71 for use, and it will be understood that the said means is substantially the same as that described in connection with the embodiment of Figures 1–6.

Mounted at each side of the housing 72 and extending upwardly therefrom to a height substantially equal to the window height of a standard automobile, not shown, are ducts 81 and 81' the upper end portions of which are curved outwardly and downwardly as indicated. Conditioned air outlets 76 and 76' communicate with ducts 81 and 81' respectively at points near the upper end of housing 72, which points, according to the teachings of the invention, are substantially removed from the lower ends of the ducts.

Slidably received in ducts 81 and 81' are flexible hoses 82 and 82', each mounting at its outer extremity a combined air-sound outlet box 83 or 83' of the type illustrated in Figures 2 and 3; it being understood that suitable conductors may be passed through ducts 81 and 81' and hoses 82 and 82' for supplying power to the speakers contained in outlet boxes 83 or 83'.

As indicated in Figure 8 extensible springs 84 and 84' are attached to hoses 82 and 82' whereby the same are normally maintained in a retracted position, and it will be noted that the hoses are so proportioned that when in the retracted position the conditioned air outlet openings 76 and 76' are closed off. Hence if but a single automobile is being serviced the entire output of the blower motor 73 and heating element 74 may be applied to the single automobile and maximum efficiency is thus obtained. Suitable limit switches, not shown, may be provided for deenergizing motor 73 and heating element 74 when both hoses 82 and 82' are retracted as is suggested in the first-described embodiment of my invention. Operation of the apparatus of Figure 8 is substantially the same as that of the first described embodiment with the exception that patrons must adjust the retractible hoses 82 and 82' to mount the outlet boxes at their automobiles in place of adjusting the telescoping ducts 14 and 14'. After use the outlet boxes may be merely detached from the automobile and released whereupon the same are automatically drawn into retracted position by springs 84 or 84'.

Figure 9 shows a third embodiment of my invention wherein non-retractible flexible duct means are utilized for transmitting conditioned air to a parked automobile from a remotely positioned conditioning unit. The reference numeral 85 generally designates an air conditioning unit constructed in accordance with the principles of my invention and comprising a housing 86 mounting therein a blower motor 87 and heating element 88. The housing 86 is preferably mounted to a pedestal 80 by means similar or equivalent to that described in connection with the embodiment of Figure 8.

Secured to the upper end of housing 86, and extending upwardly therefrom is a large diameter duct 89 which mounts at its upper end a horizontally disposed T fitting 90 having downwardly directed outlet openings 91 and 91' therein at each end. Secured to the fitting 90 in communication with openings 91 and 91' are flexible hose members 92 and 92' respectively each carrying an outlet box at its free end as at 93. Outlet box 93 normally hangs at the side of the conditioning unit 85 as shown in Figure 9 whereby the outlet opening therein is directed downwardly and accordingly protected from rain, snow or the like. In use the box 93 may be readily affixed to the window of an automobile in the manner shown in Figure 3, and according to the objects of the invention patrons may upon leaving merely detach the box from the automobile and let it drop into its normal position. Any suitable automatic and/or manual control means may be utilized for controlling the operation of motor 87 and heating element 88 in the manner suggested in the above described embodiments.

It should now be apparent that I have accomplished the objects initially set forth. My novel arrangement for combined speaker-heater outlet boxes represents a radical improvement over prior devices which require positioning substantially wholly within a parked automobile and which accordingly interfere with the pleasure and enjoyment of the patrons. By the teachings of the present invention the relatively large and unwieldy outlet box may be attached to the outside of an automobile by leaving a small opening in one of the windows thereof whereby the occupants of the automobile are provided substantially free enjoyment of the same without the possibility of accidentally striking the outlet box whereby injury to the patron and/or damage to the outlet box or automobile window may be occasioned.

The construction of my outlet box, while permitting the same to be attached externally of the automobile, provides for full control of the sound and conditioned air issuing therefrom from within the automobile. Accurate control of the discharge of conditioned air is readily effected by manipulation of a singe control knob, and it may be understood that by providing an air-flow control valve which is positioned behind the speaker air flow may be varied at will without effect upon the volume or quality of sound emitted into the automobile.

In addition to the advantageous features of my improved combination heater and speaker outlet box alone, the use of such an outlet box permits of vastly improved arrangements for mounting the same in operative association with remotely located air conditioning units. For example, in the embodiment of the invention illustrated in Figures 1–6 I have provided universally mounted telescoping means whereby the outlet box 15 may be connected to a rigidly mounted pedestal or the like in such manner as to substantially preclude theft of the box and/or damage thereof through misuse by careless patrons. In accordance with the teachings set forth herein theater patrons have merely to detach the outlet boxes from their automobiles and drive away, whereupon telescoping ducts 14 and 14' automatically retract and fall into a downwardly directed position whereby speakers 21 are protected from rain, snow and the like. By providing suitable control means operative in response to ducts 14 and 14' falling into idle position to deenergize the air conditioning unit 13 I avoid needless waste of power.

In the illustrated embodiments in Figures 8 and 9 I have made alternative arrangements for connecting my combined speaker-heater outlet boxes with remotely positioned air conditioning apparatus, and it will be noted that in each instance the patron is relieved of the burden of deenergizing the conditioned apparatus and replacing the outlet box upon a stand or hanger.

Each of the three illustrated embodiments provide that the outlet boxes, when not in use, will hang downwardly whereby the speakers therein are protected from moisture—one of the principal causes of speaker failure in outdoor theater and similar installations.

An important feature of my invention resides in the novel arrangement for mounting the speaker-heater assemblies upon fixed pedestals located about the theater parking area. The use of a quickly disconnectible structural connection in combination with jack plug electrical connectors provides that units may be readily removed or replaced for repair and maintenance, and that they may be easily removed for storage at the end of the trade season. Another and particularly important advantage of this arrangement resides in the fact that defective units may be quickly replaced in semi-darkness, as for example during a theater performance, whereby full use of the available units may be made at all times.

Having thus described a preferred embodiment of my invention, what I claim as new and desire to secure by Letters Patent is:

1. A service installation for a parked automobile for use at outdoor theaters and the like comprising in combination a fixed pedestal; an air conditioning device mounted on said pedestal, said device comprising a motor driven fan, housing means positioned about said fan, and a conditioning element positioned in the path of air flow from said fan; duct means mounted on said housing for transmitting conditioned air therefrom, said duct means comprising a plurality of telescoping tubular elements; means mounting one of said tubular elements for universal movement with respect to said housing; flexible sealing means connecting said housing and said one of said tubular elements whereby air passing through said conditioning element is directed into said duct means; an outlet box adapted to be attached to an automobile, said box having inlet and outlet openings for the passage of air; means mounting said box to the free end of said duct means with said inlet opening in communication with said duct means, said mounting means being adapted to permit limited universal movement of said box with respect to said duct means.

2. A service installation for a parked automobile for use at outdoor theaters and the like comprising in combination a source of conditioned air under pressure; outlet means adapted to be attached to a parked automobile; said outlet means including inlet and outlet openings for the passage of air; duct means for transmitting air from said source to said outlet means comprising a fixed pedestal, a plurality of graduated tubular elements associated in telescoping relation and forming in combination an elongated longitudinally adjustable tubular passage, means mounting one end element of said plurality of tubular elements for limited universal movement with respect to said pedestal, means for mounting said outlet means for limited universal movement with respect to the other end element of said plurality of tubular elements, said last mentioned means including means for connecting said inlet opening with the free end of said tubular passage, means for connecting the other end of said tubular passage with said source, means on said outlet means for attaching said outlet means to the window of a parked automobile, and extensible spring means connecting spaced parts of said plurality of tubular elements whereby said elongated tubular passage is normally maintained in a shortened condition.

3. Apparatus according to claim 2 further characterized by said conditioned air source being electrically energized and said limited movement of said plurality of tubular elements with respect to said fixed pedestal including movement into a substantially vertically downward position when said service installation is not in operation, and further including control means associated with said source of conditioned air operative in response to positioning of said plurality of tubular elements in said substantially vertically downward position to at least partially de-energize said conditioned air source.

4. A service installation for a parked automobile for use at outdoor theaters and the like comprising in combination a supporting surface; an air conditioning device fixedly mounted above said supporting surface, said conditioning device including a motor driven blower and a housing positioned about said blower; duct means for transmitting conditioned air from said housing to a point remote thereof, said duct means comprising a plurality of graduated tubular elements arranged in telescoping relation; means for mounting one end element of said plurality of elements for limited universal movement with respect to said housing, said limited movement including movement from a substantially vertically downward position to a substantially horizontally disposed position, a fixed pedestal for mounting said conditioning unit in spaced relation to said supporting surface; and means associated with said telescoping duct means adapted to normally maintain said duct means in a collapsed condition; said pedestal, said housing, and said duct means being so proportioned that when said duct means is collapsed and disposed substantially in a vertically downward position the lower end of the said duct means clears said supporting surface.

References Cited in the file of this patent

UNITED STATES PATENTS

| Number | Name | Date |
|---|---|---|
| 1,685,345 | Voss | Sept. 25, 1928 |
| 1,998,924 | Crook et al. | Apr. 23, 1935 |
| 2,230,020 | Webster | Jan. 28, 1941 |
| 2,529,425 | Sharp | Nov. 7, 1950 |
| 2,588,086 | Cole | Mar. 4, 1952 |
| 2,588,756 | Ofterbro et al. | Mar. 11, 1952 |
| 2,614,478 | Herman, Jr. | Oct. 21, 1952 |
| 2,619,893 | Nellven et al. | Dec. 2, 1952 |
| 2,660,943 | Dion et al. | Dec. 1, 1953 |

FOREIGN PATENTS

| Number | Country | Date |
|---|---|---|
| 638,107 | Great Britain | Nov. 7, 1947 |